United States Patent
Eipper et al.

[11] Patent Number: 6,152,260
[45] Date of Patent: Nov. 28, 2000

[54] METHOD OF FILLING CAVITIES IN WORKPIECES OR SEMI-FINISHED PRODUCTS AND STRUCTURAL COMPONENTS PARTS FOR MOUNTING ON OR IN A MOTOR VEHICLE

[75] Inventors: Konrad Eipper, Ammerbuch; Wolfgang Fussnegger, Tuebingen, both of Germany

[73] Assignee: DaimlerChrysler AG, Stuttgart, Germany

[21] Appl. No.: 09/108,408

[22] Filed: Jul. 1, 1998

[30] Foreign Application Priority Data

Jul. 1, 1997 [DE] Germany ............................ 197 27 907

[51] Int. Cl.$^7$ ................................. F01N 1/82; G01K 1/82
[52] U.S. Cl. ......................... 181/296; 181/252; 181/256; 181/290; 181/294; 428/307.3; 428/312.2; 428/317.9; 264/42; 264/46.9
[58] Field of Search ................................... 181/252, 256, 181/290, 294, 296, 222; 428/307.3, 312.2, 317.9; 264/42, 45.4, 46.4, 46.9

[56] References Cited

U.S. PATENT DOCUMENTS

| 3,635,676 | 1/1972 | Sands ....................................... 23/209.4 |
| 4,285,909 | 8/1981 | Mizusawa et al. |
| 4,734,323 | 3/1988 | Sato et al. ............................... 428/317.3 |
| 5,153,388 | 10/1992 | Wittenmayer et al. .................. 181/290 |
| 5,518,806 | 5/1996 | Eder et al. ............................... 428/218 |

FOREIGN PATENT DOCUMENTS

| 33 23 801 | 1/1985 | Germany . |
| 3636113A1 | 4/1987 | Germany . |
| 36 25 080 | 1/1988 | Germany . |
| 3826011A1 | 2/1990 | Germany . |
| 3826012A1 | 2/1990 | Germany . |
| 4038979A1 | 6/1991 | Germany . |
| 40 16 710 | 11/1991 | Germany . |
| 40 39 863 | 2/1992 | Germany . |
| 4028895C1 | 2/1992 | Germany . |
| 4227393A1 | 3/1993 | Germany . |
| 63-54217 | 3/1988 | Japan . |
| 401018982 | 11/1989 | Japan ............................ C04B 38/08 |
| 4-214081 | 8/1992 | Japan . |
| 5-278049 | 10/1993 | Japan . |
| 7-88874 | 4/1995 | Japan . |
| 7-232665 | 9/1995 | Japan . |
| WO92/02574 | 2/1992 | WIPO . |
| WO 96/36660 | 11/1996 | WIPO . |

OTHER PUBLICATIONS

"Neuartige Werkstoffe aus Kohlenstoff für den Chemie–Apparatebau," Dr. E. Donges und Dr. O.Vohler, Sigri Elektrographit GmbH, Meitingen, Herrn Prof. Dr. L. Küchler zum 60., Geburtstag, Chemie–Ing.Techn. 42, 1970/Nr. 19, pp. 1197.

Copy of Japanese Office Action dated Sep. 28, 1999.

*Primary Examiner*—Robert E. Nappi
*Assistant Examiner*—Edgardo San Martin
*Attorney, Agent, or Firm*—Evenson, McKeown, Edwards & Lenahan, P.L.L.C.

[57] ABSTRACT

Method for filling cavities in workpieces or semi-finished products is provided, in which thermally foamable powdered carbon is added in fixed locations into the cavity to be filled and is heated together with the workpiece or semi-finished product in such fashion that the powdered carbon swells and fills the cavity as carbon foam, with the particles of powdered carbon in the delivered state being smaller than after foaming. A structural component is formed, especially a workpiece or semi-finished product for mounting on or in a motor vehicle body, having an enclosed chamber in which thermally foamable powdered carbon is added in a fixed location, with the powdered carbon being heated together with the structural element to swell the powdered carbon and form carbon foam.

20 Claims, 2 Drawing Sheets

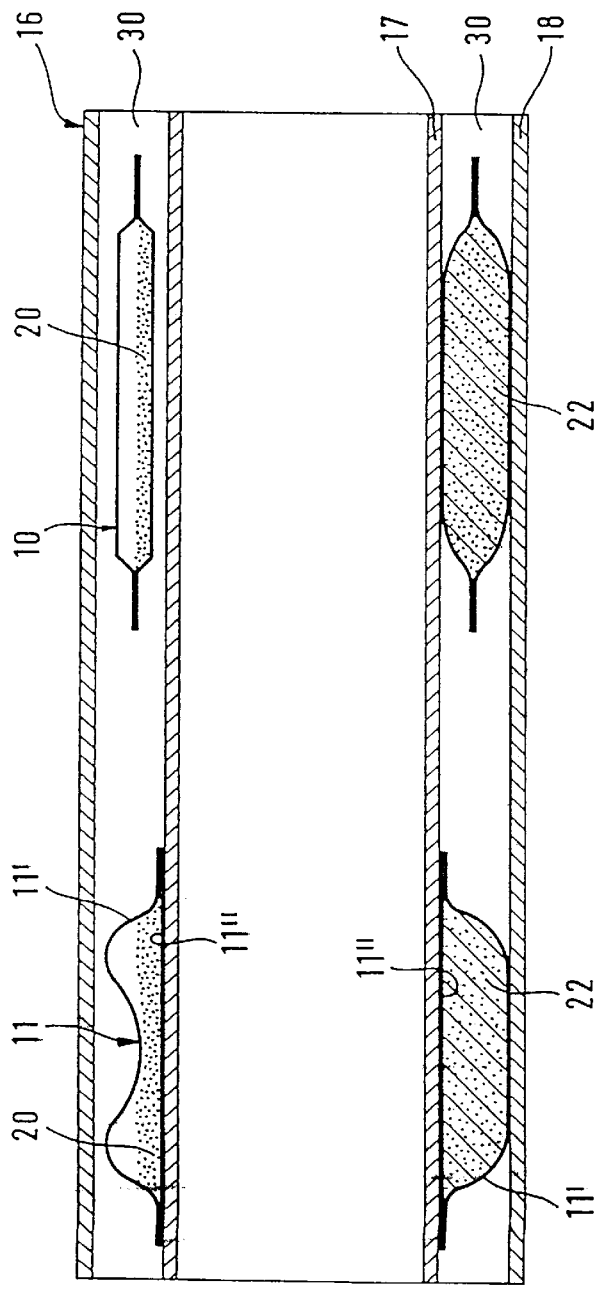
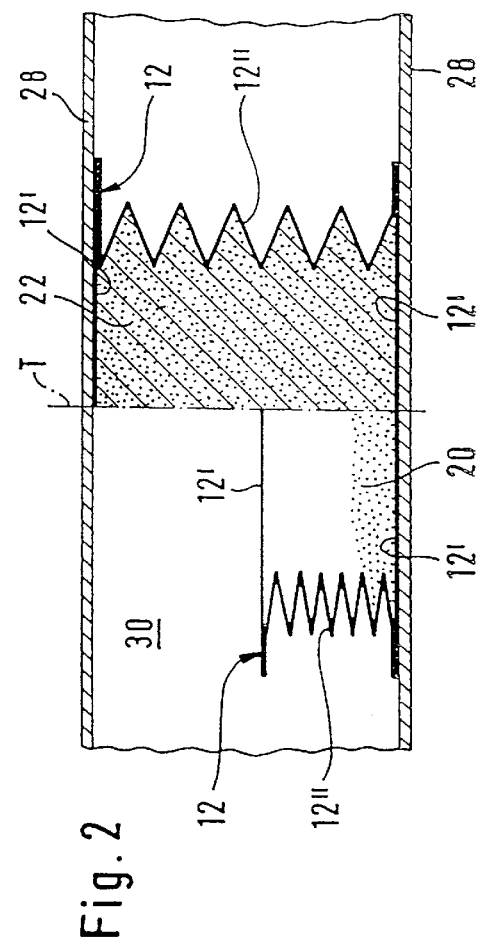

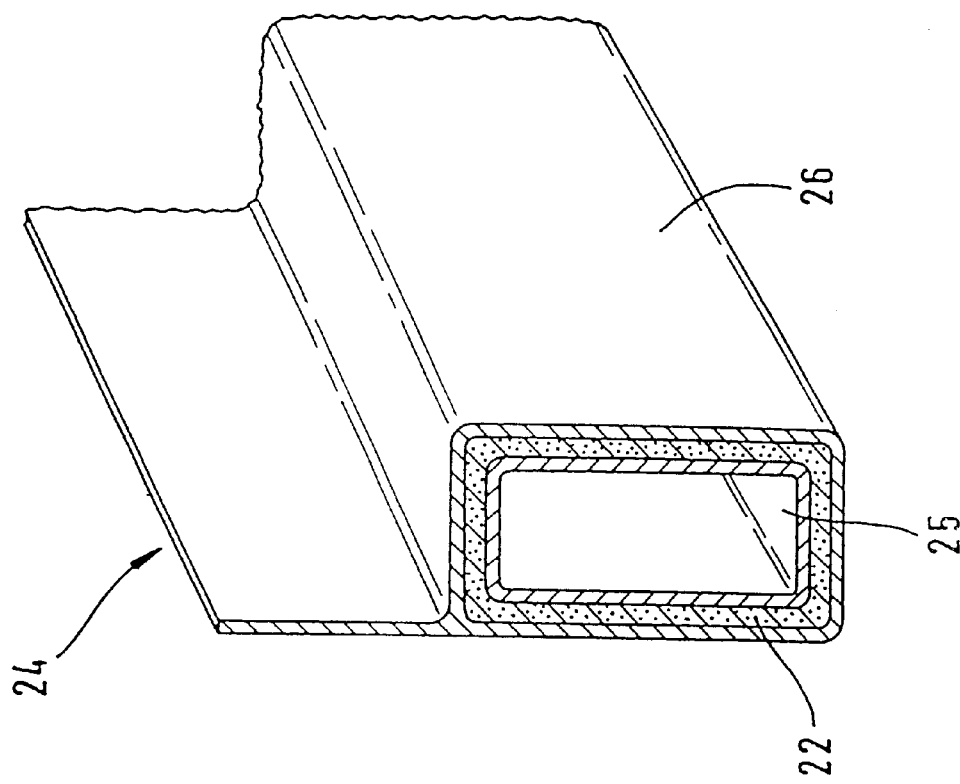
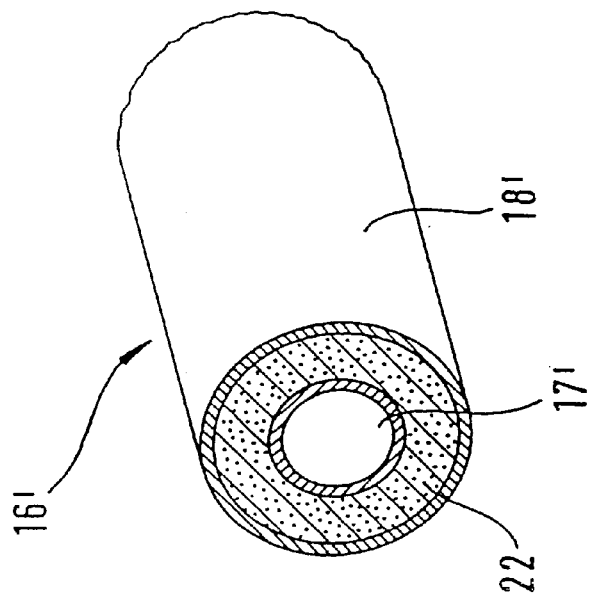

METHOD OF FILLING CAVITIES IN WORKPIECES OR SEMI-FINISHED PRODUCTS AND STRUCTURAL COMPONENTS PARTS FOR MOUNTING ON OR IN A MOTOR VEHICLE

BACKGROUND AND SUMMARY OF THE INVENTION

This application claims the priority of German Patent Application No. 197 27 907.4, filed Jul. 1, 1997, the disclosure of which is expressly incorporated by reference herein.

The present invention relates to a method for filling cavities in workpieces or semi-finished products as well as a structural component part, especially a workpiece or semi-finished product, for mounting on or in a motor vehicle.

For purposes of sound absorption and/or improvement of the stability of motor vehicle sheet metal structures that are designed to have hollow sections, it is known to fill such cavities with foam material bodies.

A method for filling hollow bodies is known from German Patent document DE-OS 38 26 012. There, a body consisting of an open-celled foam is introduced into the cavity of the hollow body. The body is covered completely by a skin that is impermeable to gas. This skin possesses at least one opening to which a vacuum for compressing the foam body is applied when the foam body is introduced. Following its introduction into the cavity, the contracted foam body is allowed to expand by disconnecting the vacuum, so that it then fills the cavity.

Another method for filling cavities is known from German Patent document DE 40 28 895 C1 in which a foam body made of elastic and compressible plastic foam, larger than the cross section of the cavity to be filled, is mechanically compressed by a sheath made of plastic and having smaller dimensions. The compressed foam body and sheath are introduced into the cavity in the body. There, the compressed foam body is initially secured mechanically in its later position inside the cavity to be filled.

The plastic sheath that encloses the foam body is resistant only up to a certain limiting temperature, so that by heating the body cavity together with the foam body at least up to the melting point of the sheath, the compression of the foam body is eliminated so that the foam body is applied internally against the body cavity under pretension.

A support with an external metal hollow body and a core made of light material is known from German Patent document DE 42 27 393 A1, with the core having an electrically conducting layer and, beneath this layer, a jacket with a material that can be foamed by applying heat. The application of heat, which is required in any event for welding the parts of a multipartite hollow body and/or for dip painting in hot paint, is utilized for the foaming process.

A double tube with a rigid outer tube is known from German Patent document DE 40 38 979 A1, with the inner tube forming a tubular body that is deformed plastically in place and is expanded radially. The body presses an insulating jacket placed around the inner tube against the inner jacket surface of the outer tube in a sealing fashion.

Sandwich semi-finished products made of a metal/plastic composite are also known in which flat or even shaped sheets are held at a distance from one another and the space between them is filled with plastic foam. The disadvantage of such composite structures is that the plastic foam poses certain problems in recycling the body and/or the semi-finished products after the lifetime of the product has been exceeded. Material separation into metal and plastic for all practical purposes is no more possible than joint trash recycling.

It is also known that carbon foam, either by itself or placed in cavities, can be produced from a plastic foam by carbonization. This method of filling hollow chambers with foam is very expensive, however. In addition, this type of carbon foam can be produced only at high carbonization temperatures and not in painted objects. In addition, these carbon foams are not ductile.

Hence, the invention has as its purpose the improvement of a method for filling cavities in, workpieces or semi-finished products in such fashion that the cavities can be filled with foam in a simple manner. In addition, the goal of the invention includes providing a structural component part, especially a workpiece or semi-finished product, for mounting on or in a motor vehicle, whose cavities can be filled with foam in a simpler manner.

To achieve this goal, the present invention provides a method for filling hollow chambers in workpieces or semi-finished products wherein thermally foamable powdered carbon is introduced in a fixed location in the cavity of the workpiece or semi-finished product to be filled, and the powdered carbon is heated together with the workpiece or semi-finished product such that the powdered carbon swells and fills the cavity as a carbon foam, with the particles of the powdered carbon being smaller in the delivered state than after foaming. With the fixed application of powdered carbon according to the invention, the fixation of the powder in the cavity is guaranteed for foaming carbon foam, so that a foaming process is made possible without an additional mold and the intended filling of cavities with foam is achieved.

In an embodiment of the invention, the cavity to be filled with foam itself serves as the mold for the carbon foam, which is suitable especially in double-walled workpieces such as pipes and sections, i.e. in hollow chambers with sufficiently small cross sections.

In another embodiment of the invention, the powdered carbon is provided in hermetically sealed aluminum foil pouches for fixed introduction into the cavity, and the pouches filled in this manner are secured at fixed locations at suitable locations in the hollow chamber to be filled. Advantageously, the foil pouch is a folded pouch whose folds enable it to unfold and expand along with the powdered carbon when it foams, enabling adaptation of the filling material to the contour to be filled with foam. The use of plastic pouches like those known from the prior art is not possible in conjunction with powdered carbon because the high foaming temperatures of about 130° C. would cause the plastic to melt prematurely and thus the fixed position of the powdered carbon would not be ensured.

In another embodiment of the invention, heating is provided by a work process that is necessary for further machining of the workpiece or semi-finished product. As a result of this measure according to the invention, the energy that would have to be expended in any event for a subsequent heating process is also utilized for the foaming process. This is especially advantageous in the embodiment in which, for filling cavities in the body, the powdered carbon is introduced into the cavities in the body-in-white phase of the body, undergoes dip painting with the body, and the foaming takes place at the same time that the dip paint is stoved.

In another embodiment of the invention, heating is performed by the normal entry into service of the workpiece. Here again, heating the workpiece that contains the hollow chamber to be filled, which would have to be done anyway, is utilized to trigger the foaming process upon the normal entry into service of the workpiece involved in this connection. This process is especially advantageous in the case of workpieces that are regularly heated to high temperatures during proper operation, for example in the embodiment of the method according to the invention in which, to fill double-walled hollow chambers of a double-walled exhaust pipe, the powdered carbon is added to the double-walled hollow chambers to be filled prior to final assembly, and the foaming takes place only when the exhaust pipe reaches its operating temperature.

As another solution to the problem that forms the basis of the invention, a structural component part is proposed according to the invention. The structural component part according to the invention, which is in particular a workpiece or semi-finished product, is provided for mounting on or in a motor vehicle and has at least one closed-off hollow chamber in which powdered carbon that can be foamed by heat is enclosed in a fixed location. The powdered carbon is heated together with the workpiece to swell the powdered carbon to form a carbon foam that fills the cavity. The particles of the powdered carbon are smaller in the delivered state than after foaming.

In an embodiment of the invention, the heat to foam the powdered carbon is provided by the entry of the structural component part into normal use.

In another embodiment of the invention, the structural component part is a double-walled, especially an exhaust-carrying pipe, with powdered carbon added directly to the double-walled hollow chamber. The foaming takes place only when the operating temperature of the pipe is reached for the first time.

In another embodiment of the invention the structural component part is a profile member (for example a side member or an A-, B-, or C-pillar for a motor vehicle body) with aluminum foil pouches containing powdered carbon that are hermetically sealed and are located at fixed positions in the (at least one) cavity.

In another preferred embodiment of the invention, the aluminum foil pouches containing the powdered carbon are added prior to or during the body-in-white phase of the body to the (at least one) cavity in order to undergo dip painting with the body, so that foaming takes place at the same time as the stoving (heating) of the dip paint.

Other objects, advantages and novel features of the present invention will become apparent from the following detailed description of the invention when considered in conjunction with the accompanying drawings.

BRIEF DESCRIPTION OF THE DRAWINGS

FIG. 1 shows a lengthwise section through a double-walled tube whose hollow chambers are provided according to the invention with pouches containing powdered carbon;

FIG. 2 shows a hollow chamber in detail located between two spaced panels, said chamber being filled with foam according to the method according to the invention; and FIGS. 3a and 3b show cross sections of workpieces filled with foam according to the invention.

DETAILED DESCRIPTION OF THE DRAWINGS

FIG. 1 shows a lengthwise section through a double-walled tube 16 that consists of an inner tube 17 and an outer tube 18 that is arranged concentrically with respect to inner tube 17, with an advantageously sealed hollow chamber 30 being located between inner tube 17 and outer tube 18.

The double-walled hollow chamber 30 of double-walled tube 16 is to be filled with carbon foam according to the invention. To clarify the function of the method according to the invention, double-walled hollow chamber 30 shown at the top in FIG. 1 is seen before it is filled with foam and double-walled hollow chamber 30 shown at the bottom in the figure is seen after being filled with foam.

To perform the method according to the invention, aluminum foil pouches 10, 11 are placed in double-walled hollow chamber 30 to be filled. The pouches are filled with powdered carbon 20 and hermetically sealed. In the case shown in the example of aluminum foil pouch 10 of FIG. 1, a pouch can be involved that is welded together from two layers with the same size blank. On the other hand, other pouch shapes are possible that expand during expansion (foaming) of powdered carbon 20 contained in the pouch, as illustrated by the example of aluminum foil pouch 11 that consists of a first layer 11" applied to the inner tube 17 and a second layer 11', with second layer 11' being welded to first layer 11" with a larger area so that when the contents of foil pouch 11 expand, first layer 11" remains pressed flat against the outer surface of inner tube 17 while second layer 11' abuts the inner surface of outer tube 18 (see the lower part of tube 16).

In the section of tube 16 that is shown at the bottom in FIG. 1, double-walled hollow chamber 30 is shown after powdered carbon 20 has been foamed to form carbon foam 22. For foaming, the workpiece (in the present case the double-walled tube 16) is heated together with pouches 10, 11 contained therein and containing powdered carbon 20, to a temperature at which powdered carbon 20 foams to form carbon foam 22. Foaming takes place with expansion of the foil walls. Foil pouches 10, 11 are pumped up practically tight by the foaming of powdered carbon 20 and thus abut the inside walls of hollow chamber 30 to be filled.

FIG. 2 shows another embodiment of the method according to the invention, with two panels 28 arranged parallel to one another, said panels delimiting a cavity 30 between them. The cavity is to be filled with carbon foam. For reasons of clarity, the two ends of hollow chamber 30 are not shown.

For a better understanding of the function of the method according to the invention, cavity 30 shown in FIG. 2 is divided by a separating line T into left-hand and right-hand areas, with the left-hand area showing the state before foaming and the right-hand area showing the state after foaming.

In the hollow chamber 30 located between the two panels 28, an aluminum foil pouch 12 is located. The aluminum foil pouch 12 is composed of two foil layers 12' essentially parallel to one another and a folded layer 12" that connects the two foil layers 12' along their outer edges with one another in the manner of a folded bellows. Powdered carbon is accommodated inside foil pouch 12, as already described above. When foil pouch 12 is heated together with panels 28, the powdered carbon 20 is foamed to produce carbon foam 22, with the two layers 12' of foil pouch 12 that are located essentially parallel to one another being pushed apart as the folded layer 12" expands, so that they contact the two panels 28 as cavity 30 is filled. If cavity 30 is to be filled completely, a large number of the aluminum foil pouches described above is advantageously used.

FIG. 3a shows in a perspective view a cross section through a double-walled tube 16' filled according to the method of the invention, said tube consisting of an inner tube 17' and an outer tube 18' arranged essentially concentrically with respect to one another. The enclosed double-walled hollow chamber located between inner tube 17' and outer tube 18' is filled with carbon foam 22, with the powdered carbon being introduced directly into the hollow chamber without using a foil pouch because of the small cross section of the double-walled hollow chamber.

FIG. 3b shows, in a perspective view, a cross section through a profile member 24 whose cavity, enclosed by an inner profile 25 and an outer profile 26, is filled according to the method of the invention with carbon foam 22, with powdered carbon being added directly to the cavity in the profile in this case as well because of the small cross section.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for filling cavities in structural components, the method comprising the acts of:
   introducing thermally foamable powdered carbon in a fixed location within a cavity of the structural component to be filled; and
   heating the thermally foamable powdered carbon together with the structural component such that the thermally foamable powdered carbon swells and fills the cavity as a carbon foam, wherein particles of the thermally foamable powdered carbon are smaller in the introduced state than after foaming.

2. The method according to claim 1, wherein the structural component is a double-walled workpiece, the act of introducing the thermally foamable powdered carbon being carried out by directly adding the thermally foamable powdered carbon into a hollow chamber formed between double walls of the double-walled workpiece.

3. The method according to claim 2, wherein the double-walled workpiece is one of a pipe and a profiled component part.

4. The method according to claim 1, further comprising the act of hermetically sealing the thermally foamable powdered carbon in a sealed aluminum foil pouch prior to the act of introducing the thermally foamable powdered carbon in the fixed location.

5. The method according to claim 1, wherein the act of heating the thermally foamable powdered carbon is performed via a defined work process necessary to further process the structural component.

6. The method according to claim 2, wherein the act of heating the thermally foamable powdered carbon is performed via a defined work process necessary to further process the structural component.

7. The method according to claim 4, wherein the act of heating the thermally foamable powdered carbon is performed via a defined work process necessary to further process the structural component.

8. The method according to claim 5, wherein the act of introducing the thermally foamable powdered carbon is performed by already adding the thermally foamable powdered carbon during a body-in-white phase of the structural component to fill the cavity thereof, the method further comprising the acts of passing the structural component through a dip painting, and foaming the thermally foamable powdered carbon during a stoving of the dip paint.

9. The method according to claim 1, wherein the act of heating the thermally foamable powdered carbon is performed when the structural component begins its normal operation.

10. The method according to claim 2, wherein the act of heating the thermally foamable powdered carbon is performed when the structural component begins its normal operation.

11. The method according to claim 4, wherein the act of heating the thermally foamable powdered carbon is performed when the structural component begins its normal operation.

12. The method according to claim 9, wherein the structural component is a double-walled exhaust pipe having a double-walled cavity, said act of introducing the thermally foamable powdered carbon into the double-walled cavity being performed prior to final assembly of the double-walled exhaust pipe, and wherein foaming of the thermally foamable powdered carbon occurs only when an operating temperature of the double-walled exhaust pipe is reached.

13. The method according to claim 1, wherein the structural component is one of a workpiece and semi-finished product.

14. A structural component for mounting in or on a motor vehicle, comprising:
   a cavity formed between at least two walls of the structural component;
   thermally foamable powdered carbon arranged in said cavity at a fixed location;
   wherein the thermally foamable powdered carbon is heated together with the structural component to swell the powdered carbon to form a carbon foam which fills up the cavity, particles of the powdered carbon being smaller when arranged in the structural component than after foaming.

15. The structural component according to claim 14, wherein said structural component is one of a workpiece and a semi-finished product.

16. The structural component according to claim 14, wherein heat for foaming the powdered carbon is provided during a normal operation of the structural component.

17. The structural component according to claim 16, in which the structural component is a double-walled pipe having the thermally foamable powdered carbon directly introduced into a double-walled hollow chamber of the pipe, foaming of the thermally foamable powdered carbon occurring only when an operating temperature of the pipe is reached.

18. The structural component according to claim 17, wherein the double-walled pipe is an exhaust-carrying pipe.

19. The structural component according to claim 14, wherein the structural component is a profiled component part, further comprising sealed aluminum foil pouches in which the thermally foamable powdered carbon is hermetically sealed, said sealed aluminum foil pouches being arranged in the fixed locations in the cavity of the profiled component part.

20. The structural component according to claim 19, wherein the sealed aluminum foil pouches containing the thermally foamable powdered carbon are arranged in the cavity before or during a body-in-white phase of the structural component such that the aluminum foil pouches undergo dip painting together with the structural component, wherein the foaming of the thermally foamable powdered carbon occurs jointly with a stoving of the dip paint.

* * * * *